April 14, 1953   J. B. HEFFNER, JR   2,635,232
RADIO DIRECTION FINDER
Filed Feb. 28, 1951
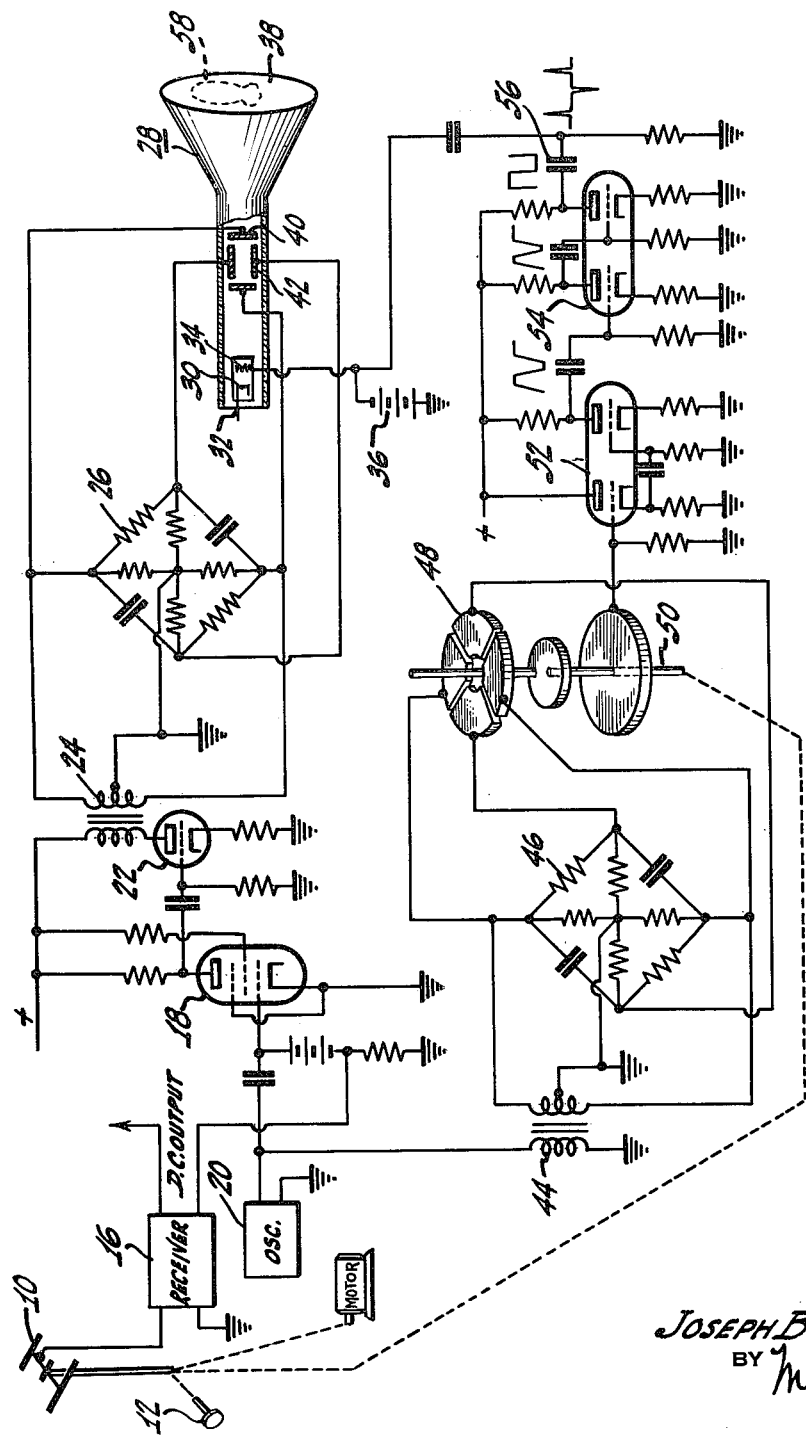
INVENTOR
JOSEPH B. HEFFNER, JR.
BY
ATTORNEY

UNITED STATES PATENT OFFICE 2,635,232

RADIO DIRECTION FINDER

Joseph B. Heffner, Jr., Upper Darby, Pa., assignor to Radio Corporation of America, a corporation of Delaware Application February 28, 1951, Serial No. 213,210

5 Claims. (Cl. 343—118)

This invention relates to radio direction finders, and more particularly is an improvement in indicator systems used with radio direction finders.

In radio direction finding systems for determining the azimuth of a signal wherein a cathode ray tube indicator is used, the cathode ray tube is required to represent the direction from which a signal is received as well as the signal amplitude. In this manner the azimuth of the signal is readily seen as the direction from which the greatest signal amplitude is received. In one of these types of radio direction finding systems, an antenna having a directional receiving pattern is rotated and the amplitude of the signals received are used to determine the amplitude of the diameter of a circle made by rotating the electron beam of a cathode ray tube.

In order to identify the direction of the single antenna with the representation shown on the cathode ray tube screen, several different approaches have been taken. One of these is to have a revolving yoke coil around the neck of the cathode ray tube which serves to magnetically rotate the electron beam in the tube. The yoke is driven in synchronism with the antenna and therefore the beam position is representative of the antenna position. Another system, shown in Patent No. 2,468,110 to Richardson is to apply quadrature voltages, from an oscillator which is oscillating at a high frequency, to the deflection plates of a cathode ray tube to rotate the electron beam. The amplitude of the oscillator output is determined by the amplitude of the signal voltages received. A mask with a radial slot is mounted to be rotatable at the screen of the cathode ray tube. The mask is driven in synchronism with the rotating antenna and the representation shown is a succession of dots.

In both the rotating yoke and rotating mask systems problems of mechanical alignment are presented and expensive motor equipment of the selsyn type is required. These schemes have been favored, however, in view of the difficulty of passing low frequency positional signals, from means such as a goniometer at the antenna, through balanced modulators, transformers and the like to properly position the electron beam in relation to the antenna.

It is an object of the present invention to provide an improved all-electronic cathode ray tube indicator system for radio direction finders which does not use a motor driven mechanism at the cathode ray tube.

It is another object of the present invention to provide a novel and inexpensive all-electronic cathode ray tube indicator system for radio direction finders.

It is still a further object of the present invention to provide an all-electronic cathode ray tube indicator system having an improved direction indicating presentation.

These and further objects of the present invention are achieved by providing a cathode ray tube indicator system wherein an oscillator generates oscillations at a frequency which is much higher than the frequency of rotation of a rotatable antenna whose azimuthal position is sought to be indicated. Signals received by the antenna are used to control the gain of a variable gain amplifier. The oscillator output is applied to the variable gain amplifier. The amplifier output is then split into four phases and used to rotate the cathode ray beam at a high frequency in a circular path whose diameter is determined by the amplitude of the received signal. The cathode ray beam is maintained biased off. Another portion of the oscillator output is split into four phases and used to excite a four-phase phase-shifting condenser. This condenser is driven in synchronism with the rotatable antenna and provides an output the phase of the occurrence of which is dependent on the azimuthal position of the antenna. This output is then shaped into a pulse, sharpened and then applied to bias on the cathode ray beam for the duration of the sharpened pulse. The cathode ray tube screen therefore displays a dot pattern indicative of the relative signal amplitude and its azimuth.

The novel features of the invention as well as the invention itself, both as to its organization and method of operation, will best be understood from the following description, when read in connection with the accompanying drawing, in which a partial schematic, partial circuit diagram of an embodiment of the invention is shown.

A search antenna, having a directional pattern, is rotated by a hand crank 12 or by a motor 14, as is desired, in order to determine the azimuth of a signal being received. Any received signals are detected by a receiver 16 connected to the antenna. A portion of the detected signal is used to control the gain of a variable gain amplifier 18. An oscillator 20 provides oscillations at a frequency which is high when compared with the maximum speed of rotation of the antenna 10. The oscillator output is divided into two portions. One portion is applied as input to the variable gain amplifier 18. The variable gain amplifier output is applied to another amplification stage 22. The output from the latter amplification stage 22 is applied, through a coupling transformer 24, to a phase splitting bridge 26. This bridge, in a manner well-known in the art, provides a four-phase output which is applied to the horizontal 40 and vertical 42 deflecting plates of a cathode ray tube 28.

The cathode ray tube 28 besides the vertical and horizontal deflecting plates has the usual beam-producing means including an electron gun 30 having a cathode 32 and a grid 34 which has a bias applied from a bias source 36 so that the electron beam is normally biased off. The electron beam is directed toward the screen 38 of the cathode ray tube. The tube has the usual power supply provided therefor. This is well known in the art and is not shown here in the interests of maintaining clarity in the drawing.

Another portion of the oscillator output is coupled through a coupling transformer 44 to a second phase splitting bridge 46. The output of the bridge is used to excite a four-phase phase-shifting condenser 48. The condenser has the shaft 50 of its rotor coupled to be driven in synchronism with the antenna 10 so that the phase of its output is always an indication of the azimuth angle made by the antenna with a given zero angle position. The four-phase phase-shifting condenser 48 is found described in chapter 9 of volume 17 of the Radiation Laboratory series. The book is by Blackburn, is entitled "Components Handbook" and is published by the Mc-Graw-Hill Publishing Company. The condenser 48 consists of a solid circular plate opposed by a circular plate divided into four separately insulated quadrants. A rotor plate revolves between these two plates. The four-phase output from the phase-splitting bridge is connected to each of the quadrants of the divided circular plate. Output is derived from the solid circular plate. The output is a voltage whose occurrence in time is dependent upon the quadrant of the condenser plate wherein the rotor is positioned and this of course depends upon the antenna position.

The condenser output is applied to a series of pulse shaping amplifiers 52, 54 and the output of these pulse shapers is differentiated by a differentiating network 56. The differentiating network output is applied to the grid 34 of the cathode ray tube 28 to overcome the blanking bias and to permit the electron beam to reach the screen for the duration of the differentiated pulses. In view of the synchronism of the condenser rotor with the antenna, the cathode ray tube screen 38 will show a bright dot whose angular position from a given zero position corresponds to the azimuth angle of the antenna. In view of the variable gain amplifier connections, the distance of the dot from the center of the cathode ray tube screen corresponds to the amplitude of the signal received. Therefore, upon the antenna being rotated, a typical pattern 58 is shown on the cathode ray tube screen 38. The azimuth of the signal is readily identified as the angle at which the dots on the screen are farthest from the center of the tube. Effectively, a polar coordinate plot of the signals received by the rotating antenna is made on the cathode ray tube screen.

By way of example, a typical frequency used for the oscillator is 10 kc. for a rotation speed for the antenna of 35 cycles per minute using a 5-inch cathode ray tube. In general, the greatest pattern detail will be obtained by using a small duty cycle, a high oscillator frequency and a low rotational speed for the antenna. The duty cycle is dependent on the tube diameter, the spot diameter and the amount of elliptical distortion that can be tolerated. For a given tube diameter, the greater the difference between the antenna rotation speed and the oscillation frequency, the faster the rise time that can be plotted without the dots becoming discontinuous. This system permits the entire screen and signal pattern to be seen simultaneously when long persistence phosphors are used in the cathode ray tube even at slow antenna scan rates.

From the foregoing description, it will be readily apparent that there has been provided an improved, novel, inexpensive, all-electronic cathode ray tube indicator system for radio direction finders. Although there has been shown and described but a single embodiment of the present invention, it should be readily apparent that many changes may be made in the particular embodiment herein disclosed and that many other embodiments are possible, all within the spirit and scope of the present invention. It is therefore desired that the foregoing shall be taken as illustrative and not as limiting.

What is claimed is:

1. An electronic polar coordinate indicator system for a rotating antenna comprising a cathode ray tube having a screen, means in said tube for producing an electron beam directed toward said screen, means for rotating said beam at a speed which is high compared to the speed of rotation of said antenna, means to vary the diameter of rotation of said beam responsive to the amplitude of signals received by said antenna, means to maintain said beam biased off, and means to bias said beam on only when said beam reaches an angular position while being rotated corresponding to the angular position of said rotatable antenna.

2. An electron system for indicating the azimuth of signals comprising a rotatable search antenna for receiving said signals, means for rotating said antenna, a cathode ray tube having a screen, means in said tube for producing an electron beam directed toward said screen, means to generate electrical oscillations at a frequency which is high when compared to the speed of rotation of said antenna, means to vary the amplitude of said oscillations with the variations in amplitude of signals received by said antenna, means to rotate said electron beam with said amplitude varied oscillations, means to maintain said beam biased off, and means responsive to said rotatable antenna position to bias on said beam only when said beam reaches an angular position while being rotated corresponding to the angular position of said rotatable antenna.

3. A signal azimuth indicating system comprising an antenna having a directional radiation pattern for receiving said signals, means to rotate said antenna, a cathode ray tube having a screen, means in said tube for producing an electron beam directed toward said screen, means for rotating said beam at a speed which is high compared to the speed of rotation of said antenna, means to vary the diameter of rotation of said beam responsive to the amplitude of signals received by said antenna, means to maintain said beam biased off, means to generate pulses the phase of occurrence of which is determined by the angular position of said antenna, and means to apply said pulses to said cathode ray tube to bias on said beam for the duration of said pulses whereby a dot pattern of the signal field in which said antenna rotates is displayed on said screen.

4. A signal azimuth indicating system comprising a directional antenna for receiving said signals, means to rotate said antenna, a cathode ray tube having a screen, means in said tube for producing an electron beam directed toward said screen, means to generate electrical oscillations at a frequency which is high when compared to the maximum speed of rotation of said antenna, a variable gain amplifier to the input of which said oscillations are applied, means to control said amplifier gain in accordance with the amplitude of signals received by said antenna, means to rotate said electron beam with the output from said variable gain amplifier, means to maintain said electron beam biased off, means to generate pulses the phase of the occurrence of which is determined by the angular position of said antenna, means to differentiate said pulses, and means to apply said differentiated pulses to said cathode ray tube to bias on said beam whereby a dot pattern of the signal field in which said antenna rotates is provided on said cathode ray tube screen.

5. A signal azimuth indicating system as is recited in claim 4, wherein said means to generate pulses the phase of the occurrence of which is determined by the angular position of said antenna comprises a four-phase phase-shifting condenser having its rotor rotated in synchronism with said directional antenna, means to split a portion of said generated oscillations into four separate phases, means to excite said four-phase phase-shifting condenser with the output of said last-named means, and pulse shaping means to which the variable phase output of said four-phase phase-shifting condenser is applied.

JOSEPH B. HEFFNER, JR.

References Cited in the file of this patent

UNITED STATES PATENTS

| Number | Name | Date |
|---|---|---|
| 2,403,967 | Busignies | July 16, 1946 |
| 2,407,281 | Johnson et al. | Sept. 10, 1946 |
| 2,475,612 | Hansel | July 12, 1949 |